June 3, 1958  M. J. GREBOWIEC  2,837,245
LOW PRESSURE FLEXIBLE WALL CONTAINER
Filed May 12, 1955

INVENTOR.
Michael J. Grebowiec
BY
ATTORNEY.

2,837,245
LOW PRESSURE FLEXIBLE WALL CONTAINER

Michael J. Grebowiec, Kansas City, Mo., assignor to Injection Molding Company, Kansas City, Mo., a corporation of Missouri Application May 12, 1955, Serial No. 507,878

2 Claims. (Cl. 222—184)

This invention relates to relatively thin walled, flexible or semi-rigid blown plastic containers and refers more specifically to a flexible or semi-rigid blown plastic container and base assembly for receiving, storing and dispensing products under relatively low pressure compression such as insect sprays, shaving cream, etc.

Heretofore, containers for products under a compression of the order of 15 and 20 pounds per square inch have been made only of rigid materials. Such materials include metal, glass and some rigid plastics. Additionally, a container has been constructed of glass coated with vinyl plastic to render it shatter-proof if broken.

There are a number of objectionable features to all of the materials above listed, varying, of course, in relation to the specific material under consideration. Rigidity is not generally a desirable factor in such product containers as it leads to breakage or permanent distortion of the form of the container under sufficient applied force. Additionally, most of the above materials have an objectionable weight factor. Some of these materials are relatively expensive compared to the flexible plastics and some, such as glass, are objectionably fragile. Many of these materials offer poor decorative possibilities, harshness of surface, additional manufacturing operations to make aesthetically attractive and, finally, require an excessive and expensive number of manufacturing operations to fabricate them into a usable product container.

The advantages of a relatively thin walled, flexible or semi-rigid container are many, such as: High speed fabrication of the container in one blowing operation, ability to form the container in a mold of almost any desired shape and design, resilience and safety under applied force, and many other features. However, in such flexible or semi-rigid walled containers certain difficulties have heretofore prevented their use in pressurized containers. Thus, if the walls of the container are made sufficiently thin to have the desired resiliency, there is a natural tendency of the container to bulge or balloon slightly under the applied compression pressure. This fact effectively prevents the employment of a concave bottom such is generally required to provide a stable base. If a concave bottom is formed in the blown container the compression pressure tends to force the bottom outwardly with concomitant excessive strain on the bottom edge.

Therefore, an object of the present invention is to provide a relatively thin walled, flexible or semi-rigid blown plastic container for receiving, storing and dispensing products under relatively low pressure compression, said plastic container embodying the above listed advantages and conveniences of containers of this sort while avoiding the disadvantages of weight, rigidity, and aesthetic unfitness as set forth for containers made only of rigid materials.

Another advantage of the present invention is to provide such a relatively thin walled, flexible or semi-rigid blown plastic container as set forth in combination with a second plastic base forming segment whereby the bottom portion of the container may be made convex, thereby avoiding excessive strains on the bottom edge of the container and the necessity of thickening the walls to a point where the desired resiliency is lost.

Other objects and features will appear in the course of the following description of the invention.

In the drawings, which form a part of the specification, and are to be read in conjunction therewith, like numerals are employed to designate like parts in the various views.

Figure 1:
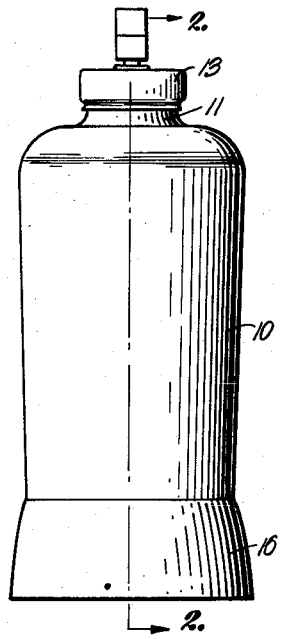
Fig. 1 is a side view of a preferred modification of a container embodying the invention.
Figure 2:
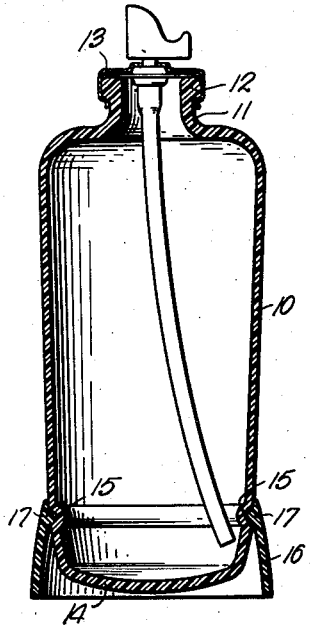
Fig. 2 is a view taken along the lines 2—2 of Fig. 1 in the direction of the arrows.
Figure 3:
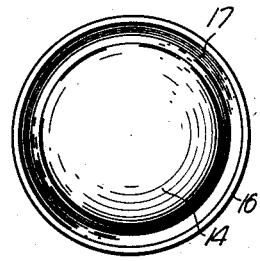
Fig. 3 is a view of the bottom of a container shown in Figs. 1 and 2.
Figure 4:
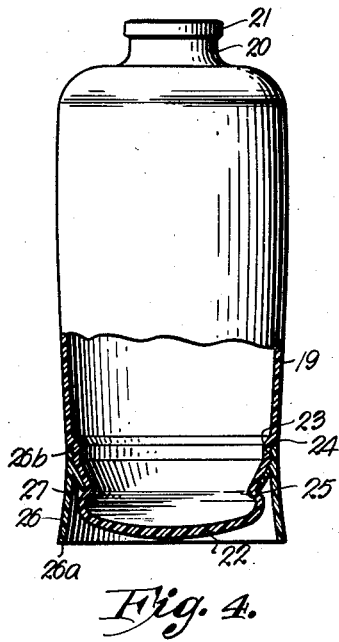
Fig. 4 is a side view with parts in section of a second modification of the invention.
Figure 6:
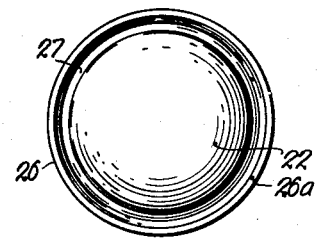
Fig. 6 is a view of the bottom of a container such as is shown in either Fig. 4 or 5.
Figure 5:
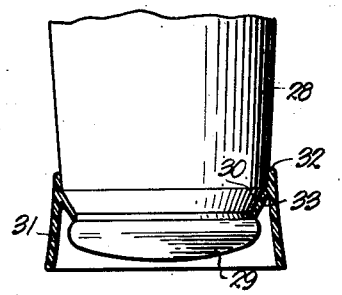
Fig. 5 is a side view with parts in section of the lower portion of a container embodying a third modification of the invention.

In the drawings are shown three modifications of a container and base assembly, each embodying the invention. Figs. 1, 2 and 3 illustrate a preferred form and modification of the invention, while Figs. 4, 5 and 6 illustrate two additional modifications. The preferred modification of Figs. 1, 2 and 3 will be described first.

Referring to Figs. 1, 2 and 3, the numeral 10 designates the side wall of the one-piece body of a relatively thin walled, flexible or semi-rigid blown plastic container of a type suitable for receiving, storing and dispensing various products under relatively low pressure compression in the range of 15 to 20 pounds per square inch. It is contemplated that such a container might have to withstand internal pressures of up to 60 pounds per square inch under certain conditions of temperature or external compression. No limitation is intended in the preceding statement other than to indicate the general contemplated pressure range of such a type of container. Any suitable plastic may be employed in the formation of such a blown container and, as an example, polyethylene is cited as an eminently suitable material possessing the required resiliency, blowing capabilities and strength. The neck portion of the container is indicated by 11 with thickened portion 12 for receiving the neck sealing construction. Any standard type, commercially produced spray or dispensing head 13 may be employed to seal the top of the container. The structure and operation of such a sealing head 13 is dependent upon the type of product contemplated for use in the container. As shown, the dispensing head 13 may be roll-crimped over the container neck to produce an air-tight seal.

Container 10 has a concave bottom 14 whereby to minimize and prevent excessive bottom edge strain due to pressurization of the contents of the container. Circumferential groove indent 15 is formed above the bottom edge in the wall 10 of the container. This indent is, of course, formed in the original container blowing process.

Base piece 16 comprises a connected flange similar in cross-sectional shape to the cross-sectional shape of the container in the vicinity of indent 15. While only round containers are shown in the drawings, it is not intended to limit the disclosure to such container forms and the inventive structure embodied in the base piece 16-container 10 combination is applicable also to irregularly shaped containers and base pieces, such as ovals, oblongs, etc. The inside top diameter of said base piece 16 is equal to the outside diameter of the container wall 10 above indent 15. Base piece 16 has inside circumferential bead 17 formed therein below the top edge of said base piece 16, said bead having a smallest inside diameter equal to the smallest outside diameter of the indent 15, whereby said base piece 16 may be readily snapped on to the container to provide a level stable base therefor. Base piece 16 has a length greater than the distance from the indent 15 to the lowest point of concave bottom 14 whereby on a level surface no point of the concave bottom touches the container supporting surface. Preferably, the lower diameter of the base piece 16 is greater than the upper diameter of said base piece.

Referring to the secondary modification of the invention shown in Fig. 4, the wall of the container is indicated by the numeral 19 and neck portion 20 has thickened top 21. At 22 is indicated the concave bottom of the container and the rationale of this structure is the same as described in the preferred modification. Formed in the wall of the container above the concave bottom is circumferential trench-like indent 23 having top edge 24 and lower edge 25. The depth of said indent is at all places either equal to or greater than the thickness of the base piece which is to be employed in conjunction with this modification of the container. The base piece or support 26 comprises a connected flange having a bottom edge 26a and a top edge 26b. The inside diameter of the top edge of said base piece 26 is equal to the outside diameter of the top 24 of indent 23 and the outside diameter of the top of base piece 26 is equal to the outside diameter of the container wall 19 immediately above said indent. Base piece 26 has an interior subflange 27 extending angularly downwardly therefrom and integral therewith. Subflange 27 is, in conjunction with the top portion of said base piece 26, equal in length to the length of said indent 23 and congruent in form therewith, whereby the base piece 26 may be snap fitted over the lower portion of said container to produce a stable base therefor. Preferably, the inside diameter of the lower edge of said flange 27 is equal to the outside diameter of the lower edge 25 of indent 23. It will be seen that base piece 26 provides, in its fitted position on the container, a smooth wall extension of the side of the container 19 in contrast with the interrupted container wall 10 of the preferred modification of Fig. 1.

Referring to the third modification of the invention shown in Fig. 5, the wall of the container is indicated at 28 and the concave bottom 29 is also illustrated. Circumferential indent 30 is formed in the wall 28 of said container above the bottom edge thereof and increases regularly in depth downwardly to a certain level and then decreases in depth at a relatively greater rate to form an essentially triangular trough in the side wall of the container. Base piece 31 having top edge 32 comprises a connected flange greater in length than the distance from the top of the indent to the lowest level of the concave bottom of the container, whereby to form, when positioned on said container, a stable base therefor. The top inside diameter of said base piece 31 is equal to the outside diameter of the container above said indent. Base piece 31 has interior subflange 33 extending angularly downwardly therefrom. Said subflange 33 is equal in length to the length of the indent and congruent in form therewith, to permit said base piece to be snapped over said bottom of the container. The inside diameter of the bottom edge of said subflange 33 is preferably equal to the least outside diameter of said indent 30. It will be seen that top 32 interrupts the line of the wall 28 of the container.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. It is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A two-piece plastic container for relatively low pressure product storage comprising, in combination, a sealable, plastic container with flexible walls of sufficient strength to receive relatively low pressure compression charges, the bottom of said container formed convex in cross section whereby to minimize pressurization strain on the bottom edge from said compression charges, a circumferential groove indent formed in the side surface of the container adjacent the bottom thereof and a snap-on plastic base piece adaptable to engage the groove and fit about said convex bottom of said container, the depth of the indent in the wall of the container ranging from the thickness of the base piece material to a greater thickness, said base piece comprising an outer ring-shaped flange having an inside top diameter essentially equal to the outside diameter of the top portion of the groove indent and an outside top diameter essentially equal to the outside diameter of the container immediately above the groove indent therein, said outer ring-shaped flange having an interior subflange integral therewith and extending downwardly and inwardly therefrom, said subflange filling the portion of the indent not filled by the base piece proper and congruent in form therewith whereby said base piece may be snap fitted on said convex bottom container, the upper edge of the base piece extending above said convex bottom of said container and the bottom edge of said base piece extending below said convex bottom of the container to form a stable resting base for the container.

2. A two-piece plastic container for relatively low pressure product storage comprising, in combination, a sealable, plastic container with flexible walls of sufficient strength to receive relatively low pressure compression charges, the bottom of said container formed convex in cross section whereby to minimize pressurization strain on the bottom edge from said compression charges, a circumferential groove indent formed in the side surface of the container adjacent the bottom thereof and a snap-on plastic base piece adaptable to engage the groove and to fit about said convex bottom of said container, the groove indent in the walls of the container forming in cross section a taper-walled trough, said base piece comprising a ring-shaped hollow outer flange having a top inside diameter essentially equal to the outside diameter of the container immediately above said groove indent, and an interior subflange integral therewith extending inwardly angularly therefrom and integral therewith at one end, said subflange congruent in form with the upper side of said trough whereby said base piece may be snap fitted to said container, the upper edge of said base piece extending above said convex bottom of said container and the bottom edge of said base piece extending below said convex bottom of the container to form a stable resting base for the container.

References Cited in the file of this patent

UNITED STATES PATENTS

| | | |
|---|---|---|
| 199,251 | Baron et al. | Jan. 15, 1878 |
| 595,323 | Lychenheim | Dec. 14, 1897 |
| 2,294,858 | Allen | Sept. 1, 1942 |
| 2,363,474 | Schlesinger | Nov. 21, 1944 |
| 2,578,907 | Tupper | Dec. 18, 1951 |
| 2,673,661 | Barton | Mar. 30, 1954 |

FOREIGN PATENTS

| | | |
|---|---|---|
| 771,150 | France | Oct. 1, 1934 |